(12) United States Patent
Caland

(10) Patent No.: US 8,374,972 B2
(45) Date of Patent: *Feb. 12, 2013

(54) MEDIA DEVELOPMENT NETWORK

(75) Inventor: Philippe Caland, Los Angeles, CA (US)

(73) Assignee: Philippe Caland, Los Angeles, CA (US)

( * ) Notice: Subject to any disclaimer, the term of this patent is extended or adjusted under 35 U.S.C. 154(b) by 0 days.

This patent is subject to a terminal disclaimer.

(21) Appl. No.: 13/302,534

(22) Filed: Nov. 22, 2011

(65) Prior Publication Data

US 2012/0143686 A1  Jun. 7, 2012

Related U.S. Application Data

(63) Continuation of application No. 12/182,222, filed on Jul. 30, 2008, now Pat. No. 8,073,733.

(51) Int. Cl.
*G06Q 30/00* (2012.01)
*G06Q 10/00* (2012.01)
*G06Q 99/00* (2006.01)

(52) U.S. Cl. ...... 705/300; 705/319; 705/329; 705/14.11

(58) Field of Classification Search ............... 705/1, 14, 705/14.44, 14.6, 14.66, 14.52, 14.11, 300, 705/319, 329
See application file for complete search history.

(56) References Cited

U.S. PATENT DOCUMENTS

| 6,792,411 | B1 | 9/2004 | Massey, Jr. |
| 7,062,457 | B1 | 6/2006 | Kaufman |
| 7,092,914 | B1 | 8/2006 | Shear et al. |
| 7,308,418 | B2 | 12/2007 | Malek et al. |
| 2002/0198763 | A1* | 12/2002 | Pittelli ........................... 705/10 |
| 2003/0055779 | A1 | 3/2003 | Wolf |
| 2004/0015427 | A1* | 1/2004 | Camelio ....................... 705/35 |
| 2005/0246625 | A1 | 11/2005 | Iyengar et al. |
| 2006/0015378 | A1 | 1/2006 | Mirrashidi et al. |
| 2006/0015904 | A1 | 1/2006 | Marcus |
| 2006/0271997 | A1 | 11/2006 | Jacoby et al. |
| 2007/0106551 | A1 | 5/2007 | McGucken |

(Continued)

FOREIGN PATENT DOCUMENTS

WO   2007115333   10/2007

OTHER PUBLICATIONS

Yares, Kat. How to Find Investors for Movies, 2 pages, May 23, 2009 retrieved from http://web.archive.org/web/20090523210258/http://www.ehow.com/how_5035688_investors-movies.html on Nov. 4, 2012.*

(Continued)

*Primary Examiner* — James Trammell
*Assistant Examiner* — Daniel L Greene
(74) *Attorney, Agent, or Firm* — Banner & Witcoff, Ltd.; Ross Dannenberg

(57) ABSTRACT

Methods and systems for encouraging and identifying new talent, as well as an incentive structure for financing creative/media projects, are described. A social network web site allows users to post their own content, and filters users to the top who have achieved a given level of popularity. Popular users can then post media proposals to a private section of the web site, through which established stars and talent review the proposals. Users, in exchange for access to the private section, grant to a proprietor of the web site an option to make one or more future productions with that user at a reduced rate should that user reach stardom. Established stars and talent, in exchange for participating in a media proposal at a reduced rate, receive an interest in one or more productions by the user if/when the proprietor of the web site exercises an option to make a future production with the user.

17 Claims, 6 Drawing Sheets

U.S. PATENT DOCUMENTS

| | | |
|---|---|---|
| 2007/0129956 A1 | 6/2007 | Stinski |
| 2007/0169165 A1 | 7/2007 | Crull et al. |
| 2007/0186007 A1 | 8/2007 | Field et al. |
| 2007/0220575 A1 | 9/2007 | Cooper et al. |
| 2007/0243509 A1 | 10/2007 | Stiebel |
| 2007/0250901 A1 | 10/2007 | McIntire et al. |
| 2007/0294281 A1 | 12/2007 | Ward et al. |
| 2008/0022211 A1 | 1/2008 | Jones et al. |
| 2008/0040235 A1 | 2/2008 | Avedissian |
| 2008/0077517 A1 | 3/2008 | Sappington |
| 2008/0097825 A1 | 4/2008 | Leach et al. |
| 2008/0133605 A1 | 6/2008 | MacVarish |
| 2008/0162267 A1* | 7/2008 | Wolf ............................... 705/10 |
| 2008/0162287 A1 | 7/2008 | McGucken |
| 2009/0064229 A1 | 3/2009 | Morris |
| 2010/0030683 A1* | 2/2010 | Keiser et al. .................... 705/37 |
| 2010/0241723 A1 | 9/2010 | Dornbush |

OTHER PUBLICATIONS

"The sixty one—a music adventure FAQ", downloaded from <http://www.thesixtyone.com/static/faq.com>, on Jun. 20, 2008, 4 pages.

"IndieGoGo General FAQs", downloaded from <http://www.indiegogo.com/about/faqa.com> on Jun. 20, 2008, 4 pages.

"AT&T Introduces New Social Networking and Mobile Media Applications from Juice Wireless and Buzzwire", posted on Jun. 17, 2008 by Kim Poh Liaw, downloaded from <http://www.slashphone.com/att-introduces-new-social-networking-and-mobile-media-applications-from-juice-wireless-and-buzzwire-17703>, 2 pages.

"Accessing Your Inner 'Tube' On the Road", TelecomWeb News Digest, May 8, 2007, 2 pages.

"Brad Greenspan Debuts LiveVideo.com", Wireless News, Feb. 26, 2008, 1 page.

"AlstraSoft Video Share Enterprise", downloaded from <http://www/alstrasoft.com/videoshare.htm> on Jun. 18, 2008, 10 pages.

"Generating Predictive Movie Recommendations from Trust in Social Networks", J. Goldbeck, 2006, 16 pages.

"M-YouTube mobile UI: Video selection based on social influence", Aaron Marcus and Angel Perez, Lecture Notes in Computer Science (including subseries Lecture Notes in Artificial Intelligence and Lecture Notes in Bioinformatics), v 4552 LNCS, n Part 3, Human-Computer Interaction: HCI Intelligent Multimodal Interaction Environments—12th International Conference, HCI International 2007, Proceedings, 2007, p. 926-932.

\* cited by examiner

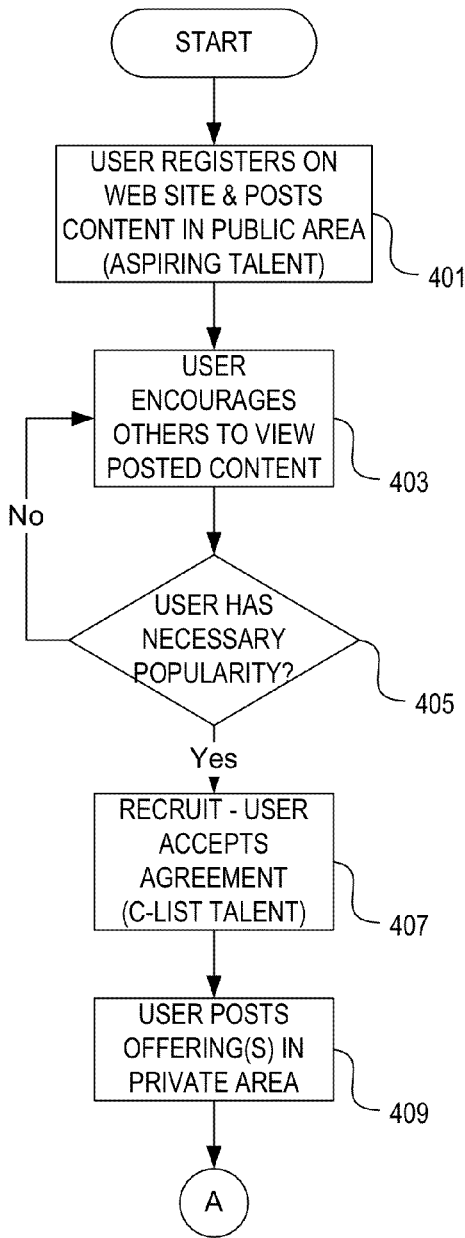
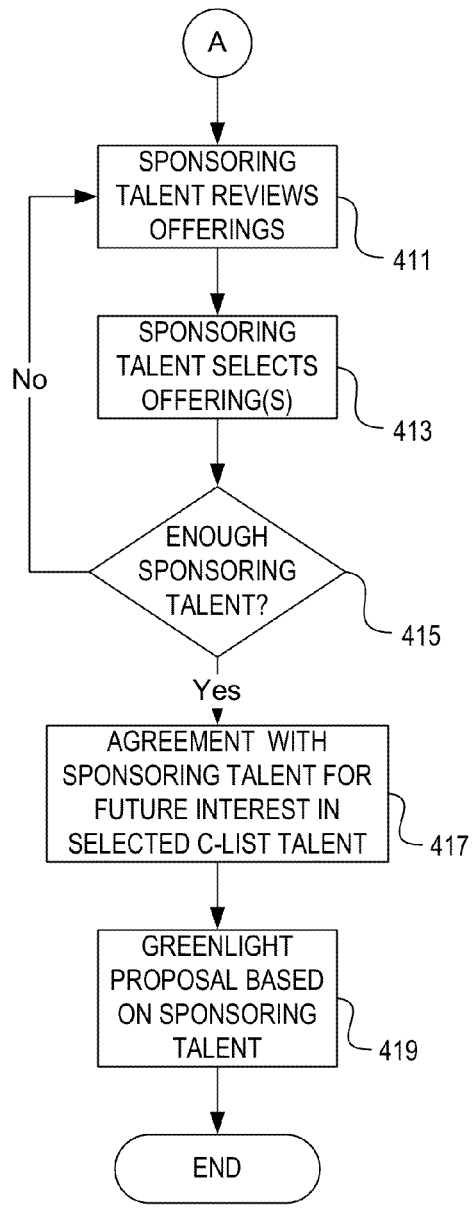
FIG. 4A
(Social Network)
FIG. 4B
(Incentive Structure)

acme.com - Discovering Aspiring Talent Every Day!

JOHN D. (C-LISTER) ★★★☆☆

My Account | Logout

Profile
C-lister since: June 20, 2008
Proposals Uploaded: 3
Average Rating: 4 stars
Friends: 2,567
Favorite Genre: Dark Comedy

CONTENT REGION

Friends (103 total):
Ursula *
Fun Bobby ***
Gunther **
Janice *****
Mr. Heckles ***
Paolo **
Dr. Burke
(see all)

Proposals/Treatments:

Out of Time
Budget: $250K - $500K
Roles Needed: MA, FA, D
Contents: P, S
Comedy: Kids try to stop their teacher from taking over the school during summer break.

Class Clown
Budget: $500K - $1M
Roles Needed: FA, D
Contents: P, L
Comedy: In a land still obiding by the caste system, a powerful landlord just wants to be a vaudeville comedian.

Polarity
Budget: $250K - $500K
Roles Needed: MA, FA, D
Contents: P, T, S
Suspense: The Earth's poles shift, causing it to reverse direction, resulting in worldwide devastation, but prompting an inspirational uprising in an unexpected way.

Content Legend:
P = video pitch
S = sample scene
L = Script
T = written summary

VIEW THIS C-LISTER'S PRODUCTIONS

*FIG. 6*

MEDIA DEVELOPMENT NETWORK

CROSS-REFERENCE TO RELATED APPLICATIONS

This application is a continuation of U.S. application Ser. No. 12/182,222 filed Jul. 30, 2008 now U.S. Pat. No. 8,073,733, issued Dec. 6, 2011, having the same title, the contents of which are incorporated by reference for all purposes.

FIELD OF THE INVENTION

The invention relates generally to filtering and processing original user-generated content and facilitating access to filtered content by production and financing entities in a given industry. The invention may be applied to media production and financing. More specifically, the invention includes a social network web site to harvest new talent, a methodology for financing productions that provides incentives for established talent to assist lesser established talent in the making of video, film, television, or other content, and an affinity network that offers further incentives, rewards and networking opportunities.

BACKGROUND

With today's technology, content, such as video, music, books, articles, commentary and the like, is being created by many people around the world. The content creator may place his content on a web site, such as a social networking site (e.g., YouTube.com), with the hope that his content will gain an audience and the attention of the industry that produces that type of content. For example, as the price of high-resolution video cameras continues to drop, the barrier to entry for making a film, movie, television show, and the like is quickly diminishing. One need only obtain a high-definition camcorder, a script, and some actors, and that person can film his or her own video production. However, with the glut of content being produced every day, it is difficult for consumers to differentiate between good and bad content without sampling everything, and it is difficult for content producers to identify up and coming talent. Content creators can post their content but have no effective way to gain visibility and access to the industry that produces their particular type of content.

In the film industry, independent films have long been a source of identifying new talent. However, with the barrier to entry for making a movie dropping in cost every year, there is more competition to get noticed as more and more people are creating content. Movies are becoming a commodity. One manner in which to differentiate content is to use established talent, e.g., a well-know actor or actress, in an independent film by an up and coming filmmaker. However, there is little incentive for movie agents to bring small or independent movies to the attention of their clients because movie agents are typically paid a percentage of their client's revenue. An independent film might only pay even a well-known celebrity $100,000 in pay, of which the movie agent might receive 10%, or $10,000. On the other end of the spectrum, studio films now routinely pay top stars $20,000,000 and up, earning their respective agents $2,000,000 (assuming the same 10% fee structure) and up, per movie. Thus, the agent has much more financial incentive to encourage his or her clients to make studio films based on the agent's pay structure and income stream.

SUMMARY

The following presents a simplified summary of the invention in order to provide a basic understanding of some aspects of the invention. This summary is not an extensive overview of the invention. It is not intended to identify key or critical elements of the invention or to delineate the scope of the invention. The following summary merely presents some concepts of the invention in a simplified form as a prelude to the more detailed description provided below.

To overcome limitations in the prior art described above, and to overcome other limitations that will be apparent upon reading and understanding the present specification, aspects of the present invention provide a three-pronged approach for filtering and harvesting media content from new talent (e.g., actors, writers, directors, musicians, etc.) for production. A first aspect of the invention provides a social network web site for aspiring talent in a particular industry. A first user (e.g., an aspiring actor, writer, director, musician, etc.) of the social network website uploads and posts her original content to her web page on a first tier of the social network. Other users of the web site are able to view the posted content, and can comment on, rate, or review the posted content, e.g., by linking to the content or becoming a "friend" of the first user. When the first user achieves a popularity rating meeting some predefined threshold, e.g., more than X friends, a content approval rating meeting minimum criteria, the content being viewed a large number of times or within the topmost percentage on the social network, or the like, the first user is then provided access to a second tier of the social network web site and may be referred to as C-list talent. A variety of predefined thresholds may be implemented. The second tier may be accessed only by a limited number of people.

In exchange for gaining access to the second tier, the first user enters into an agreement with the proprietor of the social network. For example, the C-list talent, in exchange for gaining access to the second tier of the social network web site, provides an option to the proprietor of the social network web site for participation in at least one additional production at a reduced rate if that C-list talent goes on to become B-list and/or A-list talent. That is, instead of paying that person's then A-list or B-list rate, the proprietor of the social network web site obtains the first user's participation, when that first user is A-list or B-list talent, at a rate substantially reduced from that person's then current quote or going rate. Thus, when the C-list talent subsequently participates as B-list and/or A-list talent, that person may participate within the same financial structure and obtain the same benefits of A-list and B-list participants who participate voluntarily, as further described below. Upon gaining access to the second tier, the first user (now C-list talent) can post original content, such as treatments, scripts, movie pitches, scores, and the like, to her private page on the second tier of the social network web site, to which access is limited for review by more established talents in the industry, e.g., by A-list and B-list talent and producers, as further described herein.

A second aspect of the invention includes a methodology and associated system that provide incentives to A-list and B-list talent to participate in comparatively lower budget productions based on content posted by C-list talent to the second tier of the social network web site. Upon reviewing one or more proposals (e.g., treatments, scripts, samples, and/or other "pitches") on the second tier of the social network web site, or via some other distribution channel, when an A-list and/or B-list talent decides to participate in a production, that production may be automatically approved for making based on participation by a minimum number of A-list and/or B-list talent (now referred to as "sponsoring talent"), with a budget that may be predetermined based on the number of sponsoring talent and/or C-list talent signed on to the project. In addition, the sponsoring talent may obtain an interest in the profits of the production, and/or an interest in one or more future productions of the C-list talent based on the proprietor of the social network web site exercising its option on the C-list talent, as described herein. In this manner, current A-list and B-list sponsoring talent have an incentive to participate in the production at a rate substantially lower than his or her current quote or going rate, in exchange for the possibility of higher returns if the sponsored C-list talent goes on to become an A-list or B-list talent herself.

For example, in the movie industry, because the productions developed by the proprietor of the social network web site have relatively short development cycles, the sponsoring talent can effectively use free time existing between other, typically larger and longer, engagements to participate in their selected productions from the social network web site. In addition to the benefits available to the sponsoring talent described above, the sponsoring talent can also produce income during otherwise free time by participating as a sponsor.

A third aspect of the invention includes an affinity network of private access commercial establishments ("affinity center"), accessible only to an exclusive group of talent and individuals meeting predefined criteria. Each affinity center may include one or more of the following: private screening rooms of various sizes, full-sized theater with then current motion picture viewing technology, digital distribution kiosks for downloading content to portable devices and computers, one or more lounges, bars, physical fitness equipment, spa services, and the like, which together allows each affinity center to serve as a networking venue or hub in whatever city each affinity center is located. Access to each affinity center may be limited to A-list talent only, to talent who has participated in a predetermined number of productions produced by the proprietor of the social network web site, to other individuals who have made significant accomplishments or achievements in other industries (e.g., music, politics, business, etc.), or other individuals approved by the proprietor of the social network web site.

Another aspect of the invention provides philanthropic associations between projects, users, and/or talent with one or more philanthropic organizations, thereby benefiting the philanthropic organization (financial contributions, publicity) as well as the talent/users (contributing to humanity, publicity, etc.).

Together the various aspects of the invention provide a filtering technique for identifying aspiring talent. As described in detail below, the filtering technique may be applied to the video, film and television industries. However, the present invention can also be applied to any content such as music, books, articles, commentary, criticism and the like. The invention further provides for a financing channel for producing and making productions, and incentive streams for enticing more established talent to participate in productions with lesser known or emerging talent. These and other aspects of the invention will be apparent upon reading the more detailed description below.

BRIEF DESCRIPTION OF THE DRAWINGS

A more complete understanding of the present invention and the advantages thereof may be acquired by referring to the following description in consideration of the accompanying drawings, in which like reference numbers indicate like features, and wherein:

FIG. 4A shows a method for providing access to a social networking web site according to one or more illustrative aspects of the invention.

FIG. 4B shows a method for financing a film production according to one or more illustrative aspects of the invention.

FIG. 6 shows a sample C-List Talent screenshot of a social networking web site according to one or more illustrative aspects of the invention.

DETAILED DESCRIPTION OF THE INVENTION

In the following description of the various embodiments, reference is made to the accompanying drawings, which form a part hereof, and in which is shown by way of illustration various embodiments in which the invention may be practiced. It is to be understood that other embodiments and aspects may be utilized and structural and functional modifications may be made without departing from the scope of the present invention.

1. Introduction

Figure 2:
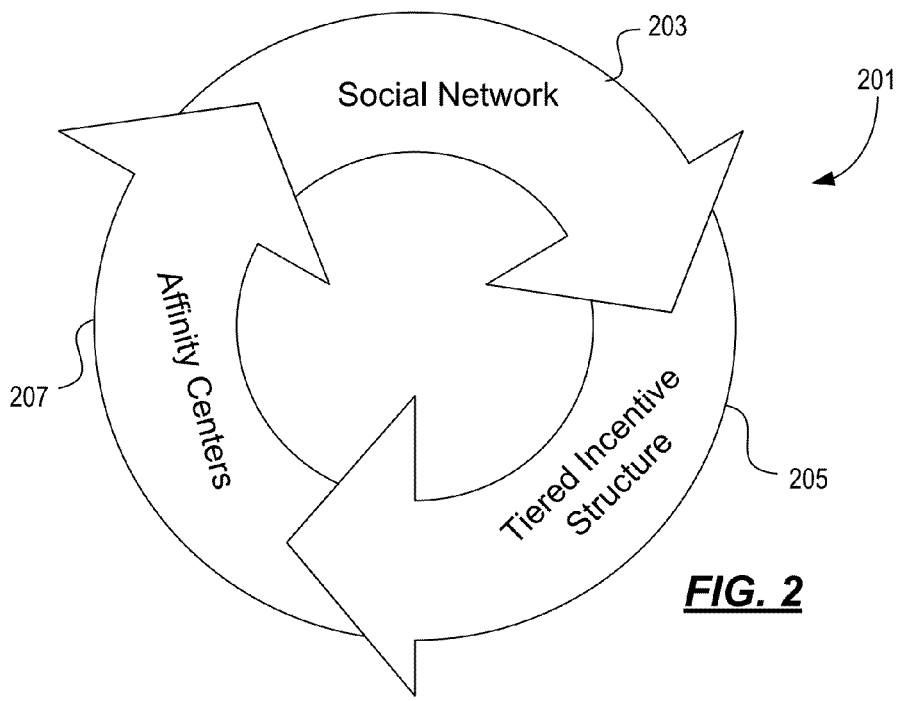
FIG. 2 shows the content flow according to one or more illustrative aspects of the invention.
Figure 3:
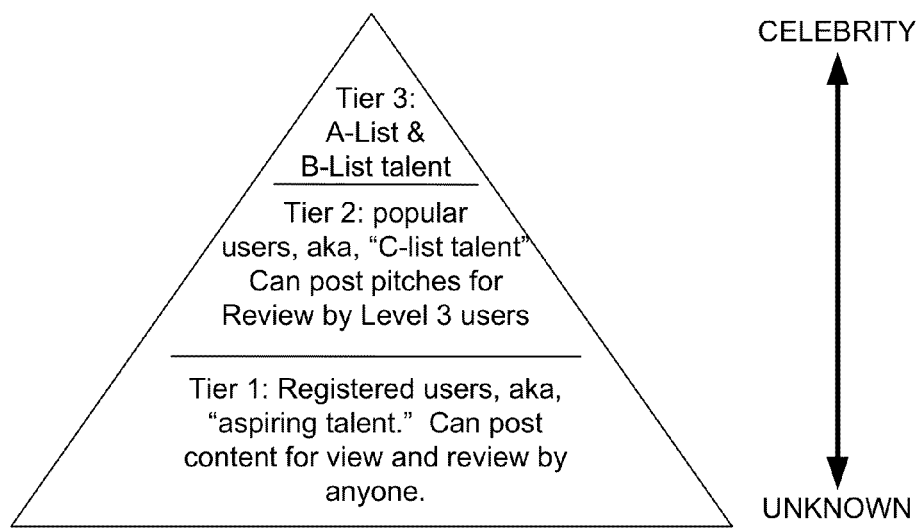
FIG. 3 shows a user tier diagram according to one or more illustrative aspects of the invention.

Aspects of the invention provide development and financing channels, also referred to as a media development network, for identifying and producing entertainment, video and other media content such as films, motion pictures, television shows, publications, music, and the like. Media may include any subjectively reviewable content including, at a minimum, any copyrightable subject matter, as well as other subjectively reviewable content such as business proposals, invention ideas, and the like. With reference to FIG. 2, the entertainment network 201 includes a three-prong regenerative cycle. The first prong 203 includes a social network that filters and identifies aspiring talent with promise ("C-list talent"). The identified C-list talent then gains access to the second prong 205 of the network, which includes an incentive structure that encourages accomplished talent to make productions with the identified aspiring talent. The incentives include branding and financial incentives to make participation by an A-list or B-list talent in a production being offered that more lucrative than previously available financial incentives, with the possibility that the production is as lucrative as or even more lucrative than participation in a "studio" film. Upon achieving a level of accomplishment in the entertainment industry, e.g., by progressing through C-list to B-list to A-list talent, access is provided to the third prong, which includes a network of affinity centers that capitalize on the branding and productions created by the social network and incentive structure. The publicity generated by the affinity network, and the desire to obtain entrance into the exclusivity it provides, acts as a cyclical incentive for aspiring talent to create and post new content on the social network in hopes of being "discovered" and gaining access to the benefits of the second and third prongs. Each of these will be described in more detail below following the description of an illustrative technical infrastructure that may be used to further one or more aspects of the invention.

Certain nomenclatures are used throughout this disclosure, and should be understood as follows. A "production" may refer to any content including motion picture, film, movie, short film, cartoon, television show, or any other video content for distribution through any medium (e.g., on the Internet, TV, theaters, etc.). A production may also refer to content such as music, writing, literature, commentary, politics, criticism and the like. When specific reference is made only to television or film or some other type of production, such reference is made for illustration only, and all other types of productions are also encompassed within such reference unless specifically stated otherwise. A production may also be referred to as media, or as a media production.

Aspects of the invention utilize a hierarchical or tiered structure in reference to industry "talent." In the context of the film industry, "talent" generally refers to an actor, writer, or director, or other person involved in making a film. Because the invention can be applied beyond the film industry, talent may also include other professions such as music, television, radio, theater, business, politics, philanthropy, art, etc. The hierarchy of talent includes at least two tiers of talent and may include any number of tiers. For purposes of illustration, four tiers of talent are described. At the highest level are A-list talent, (e.g., A-list actors, writers, and directors). A-list talent generally includes people who command the highest respect and/or highest paychecks when working on a film, TV, or other production, and typically includes branded and well known industry professionals.

The second highest level of the hierarchy is B-list talent. B-list talent generally includes accomplished individuals who regularly participate in films, television, and the like, but who do not command as large of an audience or as big of a paycheck as A-list actors simply by virtue of the B-list talent's participation in a production.

The third highest level of the talent hierarchy is C-list talent. C-list talent generally refers to individuals who have demonstrated some degree of promise and/or talent, but who have not yet participated in a commercially successful production (as defined by income, popularity, critical acclaim, and/or other generally accepted recognition of success).

At the lowest level of the hierarchy is everyone else, i.e., "aspiring talent." These are the individuals who have not yet accomplished or been in any productions of significance, and have not yet demonstrated any talent or potential. Aspiring talent includes everyone in the world who "wants to be in the movie business," but who is not included with A-list, B-list, or C-list, as defined above. Aspects of the invention may define further levels of granularity, e.g., by splitting one hierarchy in two or three distinct levels (e.g., B−, B, and B+ talent). Thus, the exact number of levels and the nomenclature of each is secondary to the hierarchical nature of each level as compared to the other levels in the specific hierarchy being used in a given production, as described herein.

Productions may be referred to in a hierarchical manner based on the level of financing each might receive in a given industry. For example, in the publishing industry, an established writer or public figure might receive a substantial advance payment to write a book, whereas a new writer might be required to write a book without even a guarantee of publication or payment just to have a chance at getting published. Similarly, in the film industry, film productions may be divided into "indie," "studio indie," and/or "studio" productions. An "indie" refers to an independently financed and produced production, for example, an independent film such as "The Blair Witch Project," etc. Indie films are typically not associated with a major movie studio. A "studio indie" refers to a movie made by an independent production company not considered one of the "major" movie production studios, i.e., a production company other than Sony, News Corp., The Walt Disney Company, Time Warner, Viacom, GE/Vivendi. It should be noted, however, that an independent production company might be owned by one of the major production companies, yet its productions might still be considered "studio indie" films. Independent movie production companies might include, as of the time of filing, studios such as Lions Gate Films, IFC Films, Samuel Goldwyn Films, Dimension Films, Warner Independent Pictures, Fox Searchlight, etc. "Studio" productions are those produced and distributed by a major movie production company, e.g., as of the time of filing, Sony, News Corp., The Walt Disney Company, Time Warner, Viacom, and GE/Vivendi.

The nomenclature of "studio, "studio indie," and "indie" is used for illustrative purposes only. Other nomenclature may alternatively be used. For example X-film, Y-film, and Z-film may replace indie, studio indie, and studio, respectively. Alternatively, white, grey, and black may be used to represent the differing levels of film. The nomenclature used is secondary to the levels of film the nomenclature represents. In addition, the aforementioned levels of productions are illustrative only. The specific hierarchical levels used in any given embodiment are not limited in any manner, other than that there is some hierarchical relationship among them.

2. Technical Infrastructure

Figure 1:
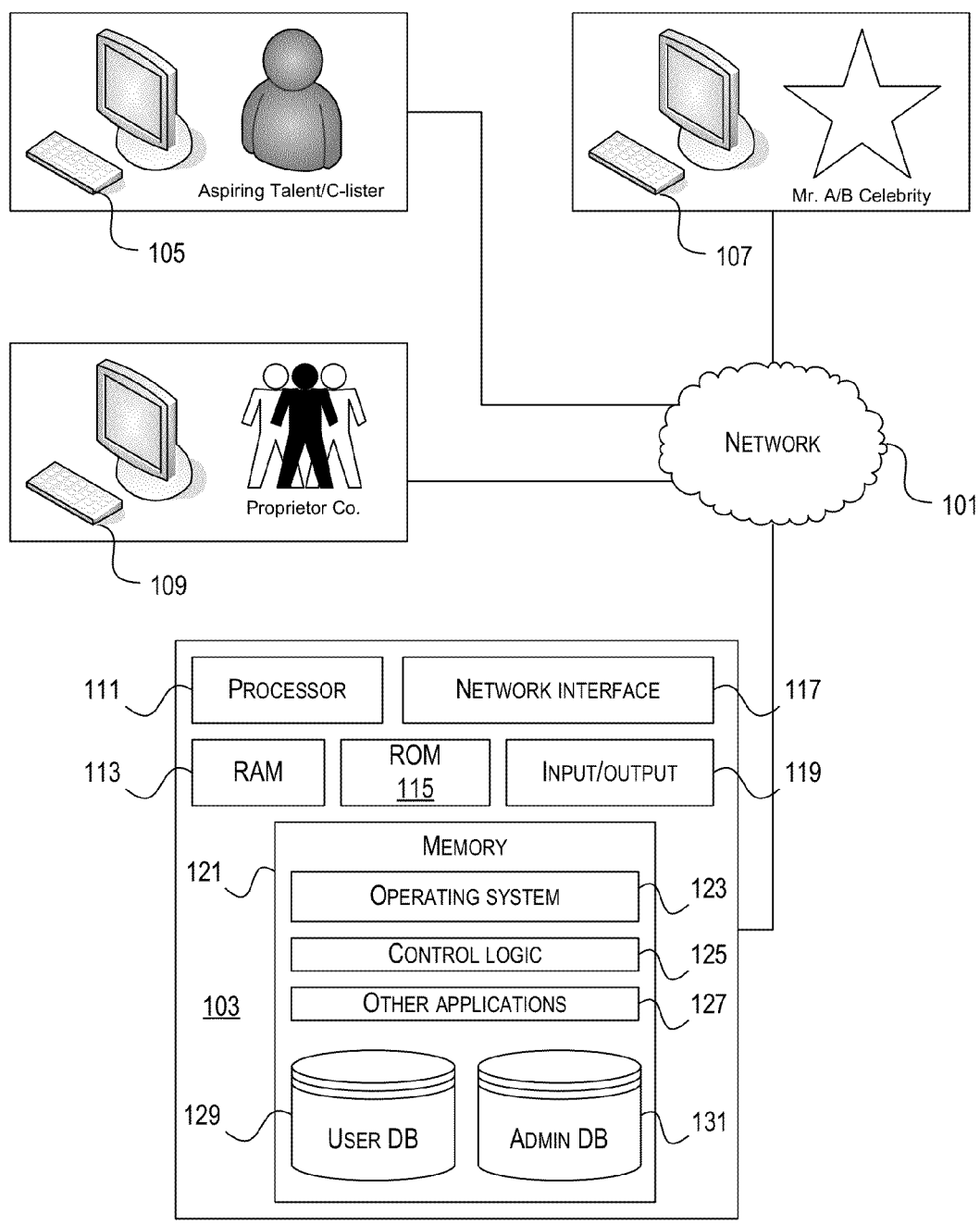
FIG. 1 shows a network and system architecture that may be used according to one or more illustrative aspects of the invention.

Aspects of the inventive entertainment network may be implemented in or performed with the assistance of one or more computers, computer networks, and the like. FIG. 1 illustrates one example of a network architecture and data processing device that may be used to implement one or more illustrative aspects of the invention. Various components 103, 105, 107, and 109 may be interconnected via a network 101, such as the Internet. Other networks may also or alternatively be used, including private intranets, local LANs, wireless WANs, personal PANs, storage area networks (SANs), and the like. The components may include a social network server 103, computer 105 associated with a user of the web site, e.g., an aspiring talent or a C-list talent, computer 107 associated with more successful talent such as A-list and/or B-list talent, and computer 109 associated with the proprietor of the social network web site and/or of the entertainment network. The social network server 103 provides overall control and administration of data communication services according to aspects described herein. The social network server 103 may be connected to a web server or may include a web server providing public accessibility to the web site, as further described herein.

Users may interact with the server 103 using remote computer 105, 107, 109. Each computer 105-109 may be any conventional data processing device that can access the Internet, e.g., laptop computers, desktop computers, ultra-mobile PCs, Internet enabled mobile devices, etc. Each computer 105-109 may be located in any location, and need not be limited to the premises of the individual or organization with whom it is associated. Each computer 105-109 may interact with server 103 using a web browser to connect to the server 103 via one or more externally exposed web sites hosted by a web server.

Servers and applications may be combined on the same physical machines, and retain separate virtual or logical addresses, or may reside on separate physical machines. FIG. 1 illustrates but one example of a network architecture that may be used, and those of skill in the art will appreciate that the specific network architecture and date processing device used may vary, and are secondary to the functionality that they provide, as further described below.

Each component 103, 105, 107, 109 may be any type of known computer, server, or data processing device. Data server 103, e.g., may include a processor 111 controlling overall operation of the data server 103. Data server 103 may further include RAM 113, ROM 115, network interface 117, input/output interfaces 119 (e.g., keyboard, mouse, display, printer, etc.), and memory 121. Memory 121 may further store operating system software 123 for controlling overall operation of the data processing device 103, control logic 125 for instructing server 103 to perform according to one or more aspects of the invention as described herein, and other application software 127 providing secondary support or other functionality which may or may not be used in conjunction with aspects of the present invention. The control logic may be referred to herein as social network software 125. Functionality of server 103 and/or social network software 125 may refer to operations or decisions made automatically based on rules coded into the control logic, or made manually by a user providing input into the system.

Memory 121 may also store data used in performance of one or more aspects of the invention, including a user database 129 and an administration database 131. The user content database may store account information regarding users who have registered to use the social network according to aspects of the invention described herein. Account information may include, e.g., user identification, name, contact information, versions of agreements or contracts to which the user has agreed (e.g., terms of use, option agreements, etc.), uploaded content, web site privileges, etc. The admin database 131 stores information not associated with a particular user. In some embodiments, the user database 129 and admin database 131 may be stored in a single database system. That is, the information can be stored in a single database, or separated into different logical, virtual, and/or physical databases, depending on system design. For example, uploaded content may be stored in yet a third database optimized for serving streaming multimedia content.

Those of skill in the art will appreciate that the functionality of data processing device 103 as described herein may be spread across multiple data processing devices, for example, to distribute processing load across multiple computers, to segregate work based on geographic location, user level, etc. In addition, one or more aspects of the invention may be embodied in computer-usable data and computer-executable instructions, such as in one or more program modules, executed by one or more computers or other devices. Generally, program modules include routines, programs, objects, components, data structures, etc. that perform particular tasks or implement particular abstract data types when executed by a processor in a computer or other device. The computer executable instructions may be stored on one or more computer readable media such as a hard disk, optical disk, removable storage media, solid state memory, RAM, etc. As will be appreciated by one of skill in the art, the functionality of the program modules may be combined or distributed as desired in various embodiments. In addition, the functionality may be embodied in whole or in part in firmware or hardware equivalents such as integrated circuits, field programmable gate arrays (FPGA), and the like. Particular data structures may be used to more effectively implement one or more aspects of the invention, and such data structures are contemplated within the scope of computer executable instructions and computer-usable data described herein.

3. Social Network

Figure 5:
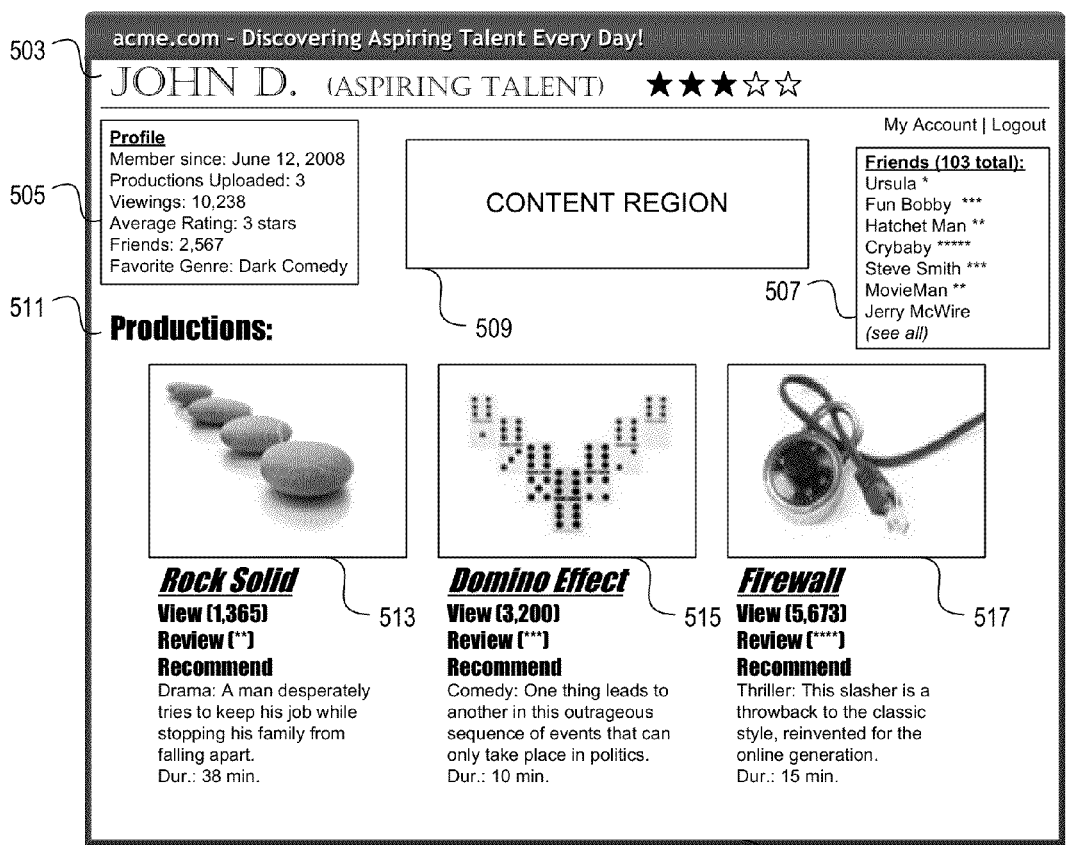
FIG. 5 show a sample Aspiring Talent screenshot of a social networking web site according to one or more illustrative aspects of the invention.

An aspect of the invention provides a social network web site through which aspiring talent can post productions based on their own content in the hopes of gaining notoriety for the work they produce. With reference to FIGS. 4A and 5-7, initially, in step 401, a new user registers on the web site via web server 103 as an aspiring talent, and posts one or more pieces of content to a content area in Level 1 designated for that user. The Level 1 content area may be a web page or pages, customizable by the user, on which the user can post one or more multimedia items such as short films, documentaries, movies, sitcoms, serial dramas, music, books, literature, writings or other works of authorship, commentary, or the like. For example, FIG. 5 illustrates a sample user page 501 for a social network web site. User page 501 includes a user heading 503 indicating the user name, level, and average rating of that user's productions. Page 501 may also include a user profile region 505, friends list 507, content region 509 (e.g., for advertisements or other content not currently displayed), and production region 511.

Production region 511 may include one or more productions containing original content uploaded by the user. In this example, production region 511 includes reference to three productions 513, 515, and 517 uploaded by the user. Each referenced production may include corresponding information indicating the number of times the production has been viewed, the average rating by other users of that production, a brief description of the production, and links to view, review, and/or recommend that production. Any user of the social network may select/click on the production name to browse to a user page providing more details solely about the selected production.

When the user is satisfied with the look and presentation of his or her content, the user begins advertising and marketing the content in step 403. Advertising and marketing may include the user sending messages to friends (personal friends and/or "friends" on the social network), family, or anyone else the user knows, suggesting they watch his productions on the social network web site. A user may also advertise to people that user does not know. The user might also do nothing more than upload content, and let the content speak for itself, relying on "word of mouth" for marketing and advertising. The user, in essence, may be encouraged to "hustle" to get others to watch his content, whether by word of mouth, online networking, tradition media advertising, etc. When others visit the user's web page 501, they can view, review, or further recommend each production using the respective links on page 501 for each production. Each review may contain a rating indicator, for example, a "star" rating of 1-5 stars (or some other range) as well as written commentary regarding the production. Upon selecting the "Review" link, a user may enter a review or read other user's reviews of that production.

In step 405, the social network control logic 125 checks to see whether each user (e.g., including user "John D.") has achieved a threshold level of popularity. If the user has not reached the threshold level of popularity, no further action is taken for that user. However, when a user has reached a threshold level of popularity, that user is recruited in step 407 (described below).

The threshold level of popularity may be based on any number of criteria. According to an aspect of the invention, the popularity threshold may include the user having a certain "star" rating while also having a minimum number of views of his productions. Alternatively, the popularity threshold may include the user having a minimum number of views irrespective of the average rating, or the user having a minimum number of friends. The number of productions uploaded, total views, average number of views per production, average rating, and number of friends, as well as any other criteria, may be used as a criteria in the popularity threshold, so long as the popularity threshold provides an indication that the user has created commercially viable content, i.e., content that others (representative of the public at large) want to view. The social network web site may further include safeguards to prevent users from cheating or "gaming" the system to fraudulently or falsely increase their popularity. Such safeguards may include preventing reviews by "friends" of the user, only allowing a user to review one of a second user's uploaded content regardless of the number of clips the second user has uploaded, etc. Other known or future developed techniques for preventing cheating may also or alternatively be used.

Once a user has surpassed the minimum popularity threshold, that user is recruited in step 407 to join the organization sponsoring the social network (or some other organization using the services of the social network) and thereby gain access to Level 2 of the social network. Level 2 of the social network includes features allowing the user to upload one or more proposals for future productions (e.g., indie productions), which may be viewed by authorized users only. A proposal may include any content intended to generate interest in and assistance with one or more future productions, and may itself include produced content, e.g., a video pitch or synopsis, scene from a proposed movie, music sample, sample chapter, script, etc. However, before providing access to the recruited user, the recruited user must enter into an agreement with the proprietor of the social networking web site (or other organization, as applicable) under which the proprietor has an option to make at least one future production with that user at a reduced rate from that user's then current future rate.

The "option" granted to the proprietor production company many vary. For example, one agreement might require the user, in exchange for gaining access to Level 2, to make one production with the organization at a reduced rate (e.g., flat fee, 10%, 50%, 90%, etc.) from that user's "quote" at the time the future production(s) is/are made, if and when the user becomes a B-list talent. The agreement might also require the user, in exchange for gaining access to Level 2, to make another production with the organization at a reduced rate (e.g., flat fee, 10%, 50%, 90%, etc.) from that user's "quote" at the time the future production(s) is/are made, if and when the user becomes an A-list talent. The agreement might not require the proprietor to make a future production with that user, e.g., if that future user never becomes popular or never produces any quality product. If the proprietor does, however, choose to make one or more future productions with that user, that user may obtain one or more benefits of the incentive structure described in section 4, below. Thus, the agreement typically grants the proprietor an option to make one or more future productions with the user, at the proprietor's discretion, and at a rate reduced from the user's then current rate, or quote, per production. The agreement may also provide flexibility so that the user and proprietor must reasonably agree regarding scheduling, subject matter of the future film, etc.

Upon full execution of the agreement in step 407, the social network stores a record of the agreement, e.g., the principal terms of the agreement, in a database 129 and/or admin database 131. The system stores data indicating the date the agreement was made, the version of the agreement, and thereby provides access to Level 2 of the social network to the recruited user, now referred to as C-list talent.

In step 409 the C-list talent may upload one or more proposals for future productions. With reference to FIG. 6, the user may upload the proposals to a private web page 601, which may appear similar to Level 1 web page 501, but may include different information. For example, profile region 505 may include information relevant to proposals instead of or in addition to information relevant to uploaded productions. Content region 509 may include different content as well, e.g., different advertisements, etc., and production region 511 is replaced with proposal region 603. Proposal region 603 includes information regarding each uploaded proposal 605, 607, 609. Web page 601 may also include a link 611 to a page where other users can view the C-list talent's uploaded production(s).

The information regarding each proposal may include any information the C-list talent chooses to upload. For example, information may include a short synopsis of the proposed production, a video clip (or "pitch") by the C-list talent regarding the proposed production, a sample filmed scene or scenes from the proposed production, or even a script, if desired. Any file may be uploaded under the confines of and within industry acceptable standards of computer security, e.g., to ensure that malware, viruses, spam, etc., are not uploaded to the social network. Other users authorized to review the C-list talent's page 601 may view and/or download any content associated with a proposal, e.g., in confidence as provided for in the terms of use of the social network.

4. Incentive Structure

A problem in the movie industry today is that there is little incentive for movie agents to bring independent or smaller movies to the attention of their clients because movie agents are paid a percentage of their client's revenue. A small film might only pay even a well-known celebrity $100,000 in pay, of which the movie agent might receive 10%, or $10,000. On the other end of the spectrum, well-known, large studio films now routinely pay top stars $20,000,000 and up, earning those respective star's agents $2,000,000 (assuming the same 10% fees structure) and up, per movie. Thus, the agent has much more financial incentive to encourage his or her clients to make studio films based on the agent's pay structure.

To address this and other problems, another aspect of the invention provides a unique incentive structure to encourage movie agents to bring a wide variety of films to the attention of their clients. By way of introduction, using incentives A-list and B-list talent are encouraged to participate in lower-budget, productions posted by C-list talent to the second tier (Level 2) of the social network web site. Upon reviewing one or more treatments, scripts, and/or pitches on the second tier of the social network web site, or via some other distribution channel, when an A-list and/or B-list talent decides to participate in a production offered via the social network web site (e.g., an indie film), that production may be automatically approved for production based on participation by a minimum number of A-list and/or B-list talent (now referred to as "sponsoring talent," e.g., because their participation alone is enough to risk financing the production in the hopes of higher returns), with a predetermined budget based on the number of sponsoring talent and/or C-list talent signed on to the project. In addition, the sponsoring talent may obtain an interest in the profits of the production, and/or an interest in one or more future productions of the C-list talent based on the proprietor of the social network web site exercising its agreement with the C-list talent. In this manner, current A-list and B-list sponsoring talent have an incentive to participate in a wide variety of productions from beyond traditional sources at a rate substantially lower than his or her current quote or going rate, in exchange for the possibility of higher returns if/when the sponsored C-list talent goes on to become a B-list and, hopefully, an A-list talent.

With reference back to FIG. 4B, the incentive structure picks up after the C-list talent has posted information for review on the social network in step 409. In step 411, sponsoring talent reviews proposals on the social network. Step 411 may include the sponsoring talent and/or his or her agent reviewing materials on the web site, downloading materials for presentation in hardcopy, etc. When a sponsoring talent decides to participate in a proposal, that sponsoring talent indicates his or her selection of the specific C-list talent's project, e.g., by entering predetermined input through the social web site, via external agreements, or by entering into a agreement online through the social network, e.g., by reading and accepting the agreement electronically, to negotiate to participate in the production in accordance with the description herein.

Incident to step 413, the social network or other system determines in step 415 whether enough sponsoring talent has selected or "signed on" to the selected production in order to automatically greenlight the production. That is, because the participation of the sponsoring talent alone is enough to virtually guarantee that the production will at least not lose money, once a predetermined level of sponsoring talent signs on to the production, the production may be automatically accepted or "greenlit" for production. The predetermined level may include one A-list talent, or may include two or more B-list talents. Alternative predetermined thresholds may also be used.

Once the threshold of sponsoring talent has been reached, in step 417 the proprietor of the website (also now called the proprietor production company, because a production will be made) finalizes arrangements and/or agreements with the sponsoring talent and the C-list talent for participation in the production, and greenlights the production in step 419, after which time cast and crew are hired, the production schedule is created, and filming can commence in due course.

According to an aspect of the invention, the project budget may also be dependent on the number and type of sponsoring talent and/or C-list talent participating in the production. A base budget might be set for the minimum level of sponsoring talent and/or C-list talent, and guaranteed budget increases might be included for additional sponsoring talent and/or C-list talent. For example, if the sponsoring talent is a single A-list talent, the production budget might be $1,000,000. If the sponsoring talent is two B-list talents, the production budget might be $1,000,000, or the budget might be something different than for one A-list talent. For each additional A-list talent, the budget might be increased by $1,000,000 or some other fixed amount or percentage. For each additional B-list talent, the budget might be increased by $500,000 or some other fixed amount or percentage. When the A-list talent is on a predefined "short list" of A-list superstars (e.g., George Clooney, Johnny Depp, Nicole Kidman, Reese Witherspoon, and the like), the budget might be increased further. Alternatively, a minimum budget might be provide for the participation of only a minimum number of C-list talent, e.g., $100,000 budget for a movie in which a group of only C-list talent participate.

Figure 7:
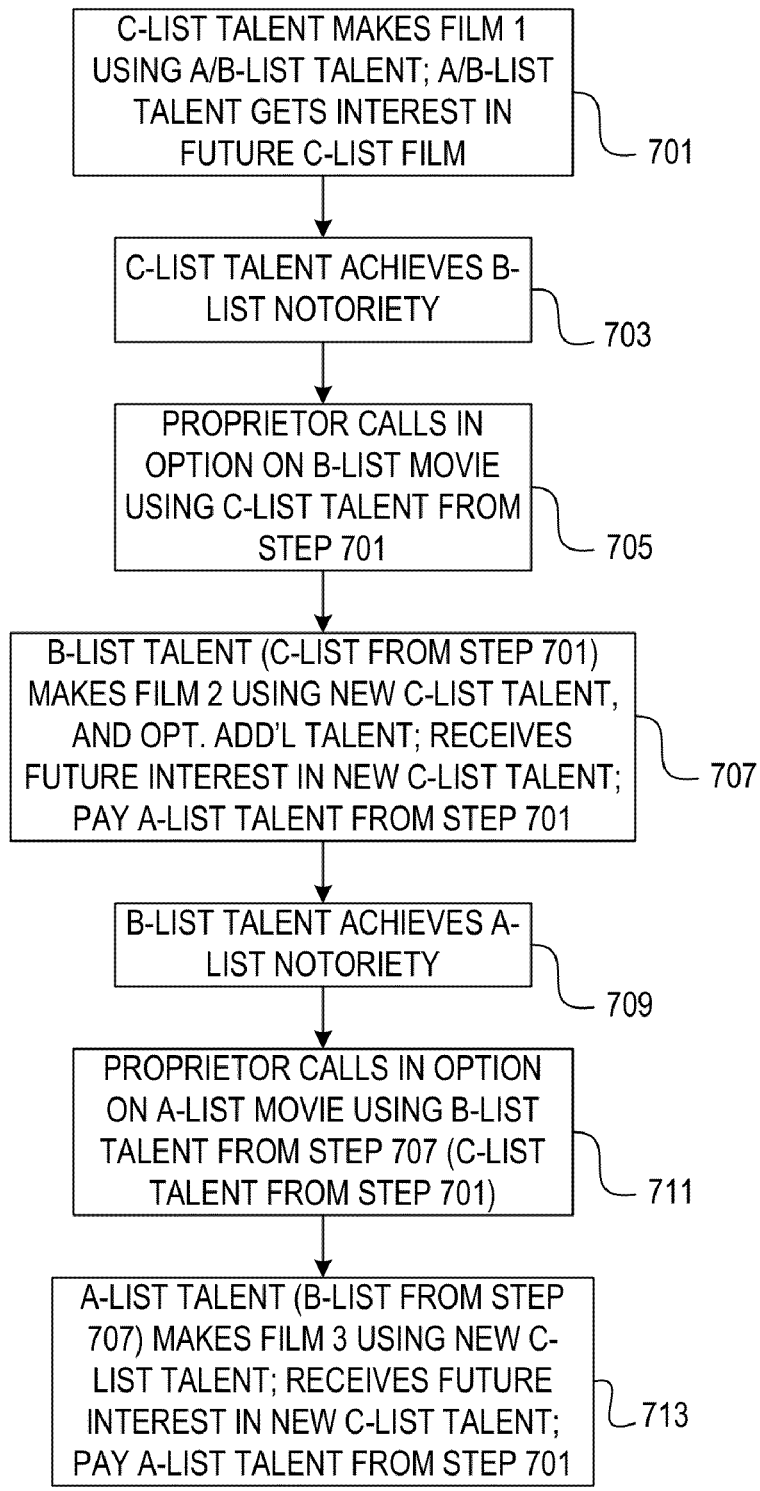
FIG. 7 illustrates a method for providing an incentive structure throughout production of a plurality of media productions, according to one or more illustrative aspects of the invention.

With further reference to FIG. 7, in step 701 the C-list talent makes a first film with the proprietor production company, using the sponsoring talent that selected that C-list talent's offerings on the social network web site in step 413 (FIG. 4). In exchange for participating in the C-list talent's film (film 1), each sponsoring talent receives an interest in one or more films in which the C-list talent participates, as agreed to in step 417 (FIG. 4). That is, when the C-list talent becomes a B-list talent (step 703), and the proprietor production company exercises its option on the C-list-now-B-list talent to make film 2 (step 705), the sponsoring talent of film 1 has a financial interest in film 2 (step 707). In addition, when the C-list talent becomes an A-list talent (step 709), and the proprietor production company exercises its option on the C-list-now-A-list talent to make film 3 (step 711), the sponsoring talent of film 1 also has a financial interest in film 3 (Step 713). Thus, the sponsoring talent participates at a greatly reduced rate up front in the hopes that the C-list talent will go on to become an accomplished and famous talent, and thereby make one or more additional movies for the proprietor production that reap large financial rewards.

Thus, the sponsoring talent has an interest in film 1, film 2 and film 3 of the C-list talent. In other embodiments, the C-list talent may receive an interest in a different number of future productions by the C-list talent. For example, the sponsoring talent might receive a future interest in only one future production, or in three or more future productions. Also, when the C-list talent becomes a B-list talent and participates in film 2, that C-list-now-B-list talent also receives a future interest in the new C-list talent whose production is being made in film 2 (step 707). Similarly, when the C-list talent becomes an A-list talent and participates in film 3, that C-list-now-A-list talent also receives an interest (e.g., a future interest) in the new C-list talent whose production is being made in film 3 (step 713). Thus, the incentive structure is cyclical in nature, insofar as while having a definitive end for each participant.

The interest that a sponsoring talent receives may vary as a negotiated amount, or may be a fixed amount for purposes of automating and/or streamlining the agreement process. For example, a sponsoring talent may receive a fixed amount or percentage of the profits of film 1, film 2, and/or film 3. The fixed amount and/or percentage may vary between films, and may vary based on whether the sponsoring talent is an A-list or B-list talent, as well as whether the sponsoring talent is a writer, director, actor, etc. The interest that a sponsoring talent may receive may further vary based on the relative differentiation in level of the A-list, B-list, and C-list talent. For example, in one alternative, instead of using A-list and/or B-list talent as sponsoring talent, the sponsoring talent may include B− talent, B talent, and/or B+ talent. A-list talent may be split into A−, A, and A+ as well. Other delineations could also or alternatively be used. The predetermined minimums of sponsoring talent, as well as the predetermined and increased budgets, may vary as well based on the levels of granularity used in defining the talent (sponsoring, participating, or otherwise). That is, the nomenclatures A-list, B-list, and C-list might merely be relative to each other (subjective), rather than being based on any specific level of notoriety or frame achieved by the individual (objective).

Tables 1-4, below, follow one C-list talent's progress through the incentive structure described above.

TABLE 1

| Film 1 | | | | |
| --- | --- | --- | --- | --- |
| Participant | Level | Role | Cost | Interest in Film |
| Adrian | A-List | Actor | flat/% of quote | 0 or more points + interest in future Carey film |
| Carey | C-List | Writer/Dir. | stipend | None—contractually obligated to two future films with proprietor production company. |

Table 1 illustrates participants in Film 1, and their respective talent levels, roles, cost (against production budget), and their respective interests in the film. Film 1 corresponds to a first film of C-list talent, Carey, who is just starting out in the film industry. Table 1 illustrates a simple scenario according to aspects of the invention where, in exchange for participating in Carey's "C-list" film, A-list talent "Adrian" participates at a reduced cost to the production company, but receives an interest in one or more future "Carey" productions, should Carey achieve B-list and/or A-list status at some point in the future and the proprietor production company exercises its option. That is, should the proprietor production company exercise its option to make a production featuring Carey as a B-list and/or A-list participant, Adrian has an interest in such film. Adrian may optionally receive a percentage of the profits of Film 1 as additional unguaranteed payment for participation in Film 1. Carey may receive a stipend to cover living expenses, etc., or some other nominal payment, as applicable.

Film 1 may be greenlit based solely on Adrian (an A-list talent) participating in Film 1. For example, as Adrian reviews proposals on the social network web site, the web site might indicate what type and how much of each level talent is needed before the film is greenlit. In addition, the social network web site might further indicate who is presently available to participant on the crew, e.g., directors (when the C-list talent is not directing the film), assistant directors, producers, line producers, directors of photography, set designers, wardrobe managers, hair stylists, makeup artists, etc., from which the A-list talent can choose. In this example, Adrian reviews Carey's proposal, likes what he sees, and decides he wants to participate in Film 1 during some down time (typically 1-4 weeks) between other films (typically large studio films which generally film for a period of months). Adrian then selects zero or more crew that he wants to ensure participate in Film 1, and finalizes his agreement with the proprietor production company based on his participation in Film 1. Film 1 gets made, and is released to the public.

TABLE 2

Film 2

| Participant | Level | Role | Cost | Interest in Film |
| --- | --- | --- | --- | --- |
| Adrian | n/a | Sponsor | None | Negotiated interest based on Carey's Indie Film |
| Beth | B-List | Actor | flat/% of quote | 0 or more points + future interest in Chris film(s) |
| Carey | B-List | Director | flat/% of quote | 0 or more points + future interest in Chris film(s) |
| Chris | C-List | Writer/Actor | stipend | None—contractually obligated to two future films with proprietor production company. |

Carey's first movie (Film 1) was quite a success, and Carey is now a B-list actor/director (due in part to Adrian's participation in Film 1). Table 2 illustrates participant information for Film 2, corresponding to a movie whereby the proprietor production company exercises its option to produce a movie based on Carey's B-list status, and using new C-list talent, Chris. In addition, based on Adrian's participation in Film 1, Adrian has a financial interest in Film 2, in which Carey participates. Beth, another B-list talent, upon reviewing Chris's proposal on the social network web site, agrees to participate in exchange for an interest in Chris's work with the proprietor production company. Thus, in exchange for participating at a reduced rate, Beth receives an interest in one or more future "Chris" productions, should Chris achieve B-list and/or A-list status at some point in the future and the proprietor production company exercises its option. Carey also receives a interest in one or more "Chris" productions, based on his participation, even though his participation is by agreement with the proprietor production company. That is, should the proprietor production company exercise its option to make a production featuring Chris as a B-list and/or A-list participant, both Carey and Beth have an interest in such film. Adrian would not have an interest in future "Chris" productions because Adrian is not an active participant in Film 2, but rather is a sponsor based on his participation in Film 1. Chris may receive a stipend to cover living expenses, etc., or some other nominal payment, as applicable.

Alternatively, only Beth might have an interest in the future "Chris" production(s) according to an embodiment where a future interest is only provided when participation is other than by the proprietor production company exercising an option.

TABLE 3

Film 3

| Participant | Level | Role | Cost | Interest in Film |
| --- | --- | --- | --- | --- |
| Adrian | n/a | Sponsor | None | Negotiated interest based on Carey's Indie Film |
| Beth | n/a | Sponsor | None | Negotiated interested based on Chris's Indie film |
| Carey | A-List | Actor | flat/% of quote | Negotiated interest based on Chris's Indie Film + future interest in David film(s) |
| Chris | B-List | Actor | flat/% of quote | 0 or more points + future interest in David film(s) |
| David | C-List | Actor | stipend | None—contractually obligated to two future films with proprietor production company. |

Carey has now made many movies and is now considered an A-list talent, star, or superstar. Table 3 illustrates participant information for Film 3, corresponding to a movie whereby the proprietor production company exercises its option to produce a movie based on Carey's A-list status. In this example, proprietor production company also exercises on option to include Chris in Film 3, based on Chris having achieved B-list status. Proprietor production company has itself selected a proposal by new C-list talent, David. For example, in this scenario, instead of Carey and Chris selecting a proposal on the social network web site, the proprietor production company has independently identified a proposal that the proprietor believes can be successful, and exercises its options on Carey and Chris to be in the film. Adrian has a financial interest in Film 3 based on his participation in Film 1, and based on Carey participating in Film 3 by virtue of the proprietor production company exercising its option on Carey to participate in Film 3. Beth has a financial interest in Film 3 based on her participation in Film 2, and based on Chris participating in Film 3 by virtue of the proprietor production company exercising its option on Chris to participate in Film 3. Carey and Chris may receive an interest in one or more future productions by David if/when the proprietor production company exercises an option to make a future production with David (e.g., based on David achieving A/B-list status). David may receive a stipend to cover living expenses, etc., or some other nominal payment, as applicable.

TABLE 4

Film 4

| Participant | Level | Role | Cost | Interest in Film |
| --- | --- | --- | --- | --- |
| Carey | n/a | Sponsor | None | Negotiated interest based on David's Indie Film |
| Chris | n/a | Sponsor | None | Negotiated interest based on David's Indie Film |
| David | B-List | Actor | flat/% of quote | 0 or more points + future interest in Frank Film(s) |

TABLE 4-continued

Film 4

| Participant | Level | Role | Cost | Interest in Film |
|---|---|---|---|---|
| Eddy | B-List | Director | flat/% of quote | 0 or more points + future interest in Frank Film(s) |
| Frank | C-List | Writer/Actor | stipend | None—contractually obligated to two future films with proprietor production company. |

Table 4 illustrates participant information for Film 4, corresponding to a movie whereby the proprietor production company exercised an option to produce a movie when David has achieved B-list status, and using new C-list talent "Frank". In addition, Carey and Chris have financial interests in Film 4, based on their previous participation in Film 3, in which David was then C-list talent (Carey's obligations to the proprietor production company were fulfilled with Film 3). Eddy, another B-list talent, and David each receive an interest in one or more future "Frank" productions with the proprietor production company. As discussed above, in an alternative embodiment, a participant optionally might not receive a future interest in the C-list talent's work when the participant is participating by virtue of the proprietor production company exercising an option to include that participant, or that participant might instead receive a smaller interest than an A/B-list participant who is not participating by virtue of the proprietor production company exercising an option, but rather is participating, e.g., after having selected that production on the social network web site.

Other alternative embodiments may vary the agreed-to obligations in different manners, based on the stature of the talent, the proposed budgets for the productions, the subject matter of the production, etc. Budget determinations may be based on a differentiation of "above the line" and "below the line" costs. Above the line costs generally refer to the allotted budget for director, actor, writer, and producer salaries, whereas below the line costs generally refer to all other production costs, including crew salary, set design, filming costs, post-production costs, etc. Thus, when additional A-list and/or B-list talent sign on to the project, the above the line budget might be increased to cover the salary of the additional sponsoring talent, and the below the line budget might also be increased (for example, because the production company is willing to risk more money when more A/B-list talent is participating in a film).

5. Affinity Network

Another aspect of the invention provides a network of one or more affinity centers, located in different geographic locations, at which affinity members (e.g., talent) can congregate, network and discuss current and future projects. For the film industry, affinity centers are preferably located in regions with large movie/film/TV/theater communities, e.g., Los Angeles, New York, Chicago, London, Paris, etc., but may also or alternatively be included in other cities. Each affinity center may include one or more bars, lounges, clubs, restaurants, digital media distribution centers, boutiques, meeting rooms, and/or screening rooms (small: 5-10 people; medium: 10-50 people; and/or large: 50+ people), each for use, rent or reservation by affinity members. Other amenities may be included as well, e.g., spa services, salon, recreational facilities, exercise equipment, etc.

Each affinity center acts as an exclusive access-controlled location, open only to members of the affinity club or under limited circumstances to people who are not members of the affinity club. For example, access may be given to any A-list and B-list talent, as well as to any talent who has progressed through the incentive structure describes above, either by virtue of starting as a C-list talent, or by participating as a sponsor, or both. Affinity centers may or may not distinguish between A-list and B-list talent. According to an aspect of the invention, crew members who participate in an indie production by the proprietor production company (e.g., smaller-part actors, hair, makeup, assistants, wardrobe personnel, etc.) may earn limited access to affinity centers. Crew members may earn affinity points as payment or in addition to monetary payment for their participation in a film, and those points may be redeemed at a specific or any affinity center, e.g., to gain access, to download digital media content, to reserve a private screening room to host a screening for friends, etc.

Affinity centers may further include private areas reserved only for members of a certain level. For example, each affinity center might include an "A-List Talent Lounge," and access is limited to A-list talent or others approved by management of the affinity centers. A-list talent might include, however, people who have made significant accomplishments not only in the film industry, but also in other industries, e.g., music, TV, politics, business, journalism, art, philanthropy, etc. The A-List Talent Lounge provides an exclusive location that any A-list member can access at any affinity center, e.g., when visiting another city, to enjoy privacy, meet with friends, conduct business meetings, etc.

Affinity centers might also include limited access to C-list talent, providing them some level of access, e.g., use of screening rooms to present proposals, access to the digital media distribution center and affinity center boutique, or other areas, while reserving access to the more exclusive areas of the club to A/B-list talent. The affinity centers thereby act as an incentive device to encourage C-list talent to go on to become A/B-list talent, thereby able to gain access to the more exclusive areas of the facility.

Affinity centers might also include areas open to the general public (including aspiring talent), e.g., an affinity center boutique. The affinity center might also feature independent films being screened in a large screening room, when not otherwise in use, and members of the public can pay to view the movie, similar to going to other movie theaters. An affinity center might also include a publicly accessible restaurant, featuring and highlighting independent films, providing a themed dining experience that helps to encourage people to want to make and view independent films. Other features may also be included or provided at each affinity center.

According to another aspect of the invention, one or more affinity centers may include an alliance or business partnership with an existing venue, e.g., an existing resort, spa, hotel, night club, entertainment or recreation location, etc., to which a limited license is given to use the trademarks of the proprietor of the social network (or other trademarks associated with the herein described methods and systems), and that provides one or more affinity center benefits as described above.

Some affinity centers may provide affinity services to the public at large, or to all registered users of the social network web site. For example, where the affinity center includes a resort or vacation property, those visiting the affinity center might be able to participate in the making of a production (e.g., movie, music, music video, theater, etc.) during their stay. Other activities might include music, art, and/or writing workshops hosted or given by more established talent in the respective industries.

6. Philanthropic Association

According to an optional aspect of the invention, talent, sponsors, participants, etc., may select a philanthropic organization (charity, non-government organization, educational institution, etc.) with which to be associated, and to which a portion of the proceeds of a film may be given. The social network web site might include a list of pre-approved philanthropies, or a user might request to add a new philanthropic organization. Organizations may be limited to those recognized under applicable law as a tax-exempt or charitable organization, e.g., an organization under 26 U.S.C. §501(c)(3) or similar.

A sponsoring talent may select a philanthropic association when that sponsoring talents signs on to a production, which carries one or more benefits for the selected philanthropic organization. The project budget might include a donation to the selected philanthropic organization of a set amount in the name of the sponsoring talent. Alternatively, the philanthropic association might receive a portion of the proceeds of the project to which the sponsoring talent commits. Yet further still, the philanthropic organization might be allowed to include a short media clip at the beginning of the film, similar to a preview or trailer, which would be viewed by anyone viewing the film and thereby informing people about the organization and how to learn more about the philanthropic organization. The philanthropic organization thereby gains the benefit of visibility to a wider audience, who each might make a further individual contribution to the philanthropic organization. Just as the philanthropic organization benefits, so does the sponsoring talent. The sponsoring talent gains the benefit of aiding a worthwhile cause, with attendant publicity, simply by agreeing to participate in an indie film, while still having the possibility of larger future returns based on the incentive structure described above.

Similarly, a C-list talent might select a philanthropic organization, which may be the same as or different from the sponsoring talent's selected organization. A designated amount of the budget might also be provided to the C-list talent's selected organization, although such amount is likely smaller than the amount provide to the sponsoring talent's selected organization. The C-list talent's selected organization might also receive a portion of the profits and/or a media clip preceding or after the film.

Aspiring talent might also select a philanthropic organization. A philanthropic organization selected by aspiring talent might benefit by receiving a contribution based on the aspiring talent's videos being viewed a threshold number of times or by the aspiring talent gaining a threshold level of popularity. In addition, if the aspiring talent becomes a C-list talent, then the philanthropic organization stands to benefit from the C-list talent's future productions as a C-list talent, and even further as a B-list talent and/or as an A-list talent. Stated another way, as the aspiring talent moves up the ladder, the contributions to the selected philanthropic organization increase.

While each philanthropic organization benefits not only from the financial contribution but also from the additional publicity it gains, each philanthropic organization can in turn help the talent (aspiring, C, B, A, or otherwise) by providing information to that philanthropic organization's members regarding the project being created by that talent. Thus, a philanthropic organization can help the success of a project by advising its members about the project, suggesting that members review an aspiring talent's material on the social network web site, etc.

As described above, one of the differentiation points the invention may use is the ability for an A-list or B-list talent (and/or C-list talent) to pick from among all philanthropic organizations, those to which a percentage (or flat amount) of the revenues from their project(s) will be disbursed. Given that most, if not all, A and B-list talent (that is, "stars") are solicited by virtually every philanthropy seeking support, the philanthropic association described herein allows stars an easy way to support the charity or charities of their choosing, while also allowing the stars to "give back" or "remember their roots" by supporting aspiring artists who are just starting their careers, but not quite knowing how to navigate the industry.

According to another aspect of the invention, web site members and sponsors can also decide a percentage of revenues generated by them to be funneled to any charity posted on the social network web site, thereby allowing philanthropies to make money while encouraging them to have their own members participate in the social network web site's online and offline activities. For example, any member of the web site might have a preferred charity, and then some overall portion of the profits of the proprietor might be distributed pro rata based on the philanthropic selections of the web site members and/or sponsors.

7. Other Aspects

While the invention has been described above primarily with respect to movie and other audiovisual media, aspects of the invention apply equally well to other types of media, e.g., music, writing, etc., as indicated above. That is, the social network can be used to filter music and bands just as it filters or vets other types of media. For example, an A-list or other popular music band might use the above-described social network to look for one or more opening acts for the A-list band's music tour or even a single gig. The proprietor of the social network and/or the A-list band, by selecting a new or relatively unknown band as an opening act, might then acquire some future interest in the selected band. The future interest might include the right to produce a future album or to include the selected band in one or more future tours when and/or if the selected band rises to the level of B-list and/or A-list band.

In yet another example, aspects of the invention may also be used with sports media. For example, boxing and other fighting events typically include more than just one fight. There may be one or more "undercard" fights that take place before the main event or title bout. The social network web site might be used to identify upcoming talent in the sport, and the participants in the main or title bout might have receive a future interest in a newer talent by selecting the newer talent for participation in an undercard event.

Another aspect of the invention allows for staff and crew members to be graded as A, B, or C-list as well. That is, each movie, concert, or other production event, is a team effort, requiring directors of photography, assistant directors, set designers, stage hands, etc. Any member of the team may be graded as C-list, B-list or A-list talent based on his or her experience. For instance, if a director of photography (DP) makes three C-list talent movies at reduced rates (to keep within a reduced budget), that DP might become a B-list talent DP and thereby have access to bigger projects that the proprietor may make with larger budgets. Similar principles may apply for hair and make up, set designers, actors, producers, writers, or any other cast, crew, or team member. Thus, the proprietor acts not only as a clearinghouse for aspiring talent, but also as a clearinghouse for the creative industries, such as film and TV, in general, thereby providing a much needed bridge that allows consumers to step into different levels of professional competence and reap the rewards, and subsequently allowing those same consumers the ability to "give back" through the same system once they have established themselves.

By merging global philanthropy (and the aggregated online communities they form) with a source of competitive content, the talent filtering and financing channels described herein synergize into a global content-driven network where user-generated content from any global user can be reviewed and vetted by an interested community whose response to that content can lead ultimately to access to more establish talent and industry resources.

Although the subject matter has been described in language specific to structural features and/or methodological acts, it is to be understood that the subject matter defined in the appended claims is not necessarily limited to the specific features or acts described above. Rather, the specific features and acts described above are disclosed as illustrative forms of implementing the claims.

What is claimed is:

1. A computer implemented method comprising:
receiving at a data processing device at least one proposal, said at least one proposal containing content being offered by a first user
providing, via a web server, access to said at least one proposal via a web site to at least one potential sponsoring participant;
receiving from one of the at least one potential sponsoring participant, a selection of one of said at least one proposal to sponsor the selected proposal;
automatically changing the potential sponsoring participant to a sponsoring participant of the at least one proposal upon selection of the proposal;
providing an interest to the sponsoring participant in one or more future productions of said first user corresponding to the selected proposal, in exchange for the sponsoring participant's participation in a production based on the selected proposal, wherein said one or more future productions are other than the production based on the selected proposal.

2. The computer implemented method of claim 1, wherein the sponsoring participant is associated with a philanthropic organization, the method further comprising:
contributing a predetermined amount of money to the philanthropic organization based on the sponsoring participant's participation in the selected proposal.

3. The computer implemented method of claim 1, wherein at least one of the first user and the sponsoring participant corresponds to a philanthropic organization.

4. The computer implemented method of claim 1, further comprising:
upon receiving the selection, determining whether an amount of sponsoring participants has exceeded a predetermined threshold; and
when the amount of sponsoring participants has exceeded a predetermined threshold, automatically approving the selected proposal for production.

5. The computer implemented method of claim 4, further comprising:
providing a predetermined budget based on an amount of sponsoring participants comprising a minimum needed to exceed the predetermined threshold; and
automatically increasing the budget a predetermined amount based on additional sponsoring talent selecting the selected proposal whereby the sponsoring participants comprises more participants than necessary to exceed the predetermined threshold.

6. One or more non-transitory computer readable media storing computer executable instructions that, when executed, provide an interactive social network, said computer executable instructions comprising:
an account registration module allowing a plurality of aspiring talent users to each create an account on the social network;
a level 1 content hosting module allowing aspiring talent users to each upload one or more media clips for review by all other users of the social network;
a popularity module tracking a popularity level of each user;
a level 2 content hosting module identifying first users who have reached a predefined popularity level and allowing the first users to upload one or more media proposals; and
a level 3 access module identifying as second users and providing access to a predefined group of potential sponsoring individuals who, upon selecting one of the media proposals, automatically causes the selected media proposal at least in part to be approved for production based on the selecting sponsoring individual participating in the production of the selected media proposal.

7. The non-transitory computer readable media of claim 6, wherein each of the second users comprises one of a director, a writer, and an actor having achieved a predetermined level of recognition in their craft, and wherein each media proposal comprises a film proposal.

8. The non-transitory computer readable media of claim 6, said computer executable instructions further comprising an agreement tracking module recording agreement information corresponding to each first user's agreement to provide a proprietor of the social network an option to make at least one future film with the first user at a reduced cost from a future rate corresponding to the first user at a time of production of the future film.

9. The non-transitory computer readable media of claim 6, said computer executable instructions further comprising a philanthropy module identifying a philanthropic organization corresponding to each of the first users.

10. The non-transitory computer readable media of claim 6, said computer executable instructions further comprising a philanthropy module identifying a philanthropic organization corresponding to each second user who has selected one of the film proposals.

11. A method comprising:
providing a first level of access to an affinity center to a first plurality of patrons, each of said first plurality of patrons being a user of an interactive social network web site that has gained access to a private second level of the social network web site based on a popularity of media uploaded by that user; and
providing a second level of access to the affinity center to a second plurality of patrons, wherein each of said second plurality of patrons is selected based on a preexisting level of fame achieved by that patron.

12. The method of claim 11, wherein each of the first plurality of patrons is associated with a corresponding philanthropic organization.

13. The method of claim 11, further comprising:
awarding one or more non-monetary points to each crew member participating in a production of an event based on a proposal submitted by one of the first plurality of users to the private second level of the social network web site;
storing a record of the one or more non-monetary points awarded in a database;
when a crew member attempts to redeem the one or more non-monetary points for a benefit at one of the physical affinity centers, querying the database to determine whether the crew member has enough points to grant the benefit; and editing the database to reflect the redemption when the benefit is granted.

14. The method of claim 13, wherein the benefit comprises entrance into the affinity center.

15. One or more non-transitory computer readable storage media storing computer executable instructions that, when executed, configure a computing device to comprise:
- a first database module for tracking a plurality of events, each event associated with a first user that created or uploaded that event, wherein the first database module further tracks a second plurality of users associated with each event, said second plurality of users being users who participated in that event; and
- a second database module tracking non-monetary points associated with each user, wherein said second database module awards one or more non-monetary points to each of the second plurality of users after participation in each event, wherein the first database module is further configured to receive a query from a computing device associated with an affinity center, said query determining whether a requesting user has at least a predetermined amount of points associated with a particular benefit selected from a plurality of benefits, and to provide a response back to the computing device with a result of the query.

16. The non-transitory computer readable media of claim 15, wherein the event is a film production, the first user is an author of a script for the film production, and each of the second plurality of users is a crew member who worked on the film production.

17. The non-transitory computer readable media of claim 15, wherein one of said plurality of benefits comprises entrance to a general area of the affinity center, wherein a second of said plurality of benefits comprises entrance to a private club within the affinity center, and wherein said entrance to the general area has a lower point requirement than entrance to the private club.

* * * * *